(12) United States Patent
Dorschner et al.

(10) Patent No.: US 9,632,345 B2
(45) Date of Patent: Apr. 25, 2017

(54) LIQUID CRYSTAL CONTROL STRUCTURE, TIP-TILT-FOCUS OPTICAL PHASED ARRAY AND HIGH POWER ADAPTIVE OPTIC

(71) Applicant: Raytheon Company, Waltham, MA (US)

(72) Inventors: Terry A. Dorschner, Marlborough, MA (US); Irl W. Smith, Concord, MA (US); Amanda J. Kirchner, Worcester, MA (US); Steven R. Collins, Lexington, MA (US); Daniel P. Resler, Carlisle, MA (US); Linda A. Palmaccio, Carlisle, MA (US)

(73) Assignee: Raytheon Company, Waltham, MA (US)

( * ) Notice: Subject to any disclaimer, the term of this patent is extended or adjusted under 35 U.S.C. 154(b) by 110 days.

(21) Appl. No.: 14/404,787

(22) PCT Filed: May 24, 2013

(86) PCT No.: PCT/US2013/042653
§ 371 (c)(1),
(2) Date: Dec. 1, 2014

(87) PCT Pub. No.: WO2013/177519
PCT Pub. Date: Nov. 28, 2013

(65) Prior Publication Data
US 2015/0146139 A1 May 28, 2015

Related U.S. Application Data

(60) Provisional application No. 61/651,440, filed on May 24, 2012.

(51) Int. Cl.
*G02F 1/1333* (2006.01)
*G02F 1/1334* (2006.01)
(Continued)

(52) U.S. Cl.
CPC ........ *G02F 1/1334* (2013.01); *G02B 6/4204* (2013.01); *G02F 1/13439* (2013.01);
(Continued)

(58) Field of Classification Search
CPC ..... G02F 2001/13775; G02F 1/133365; G02F 1/292; G02F 1/134336; G02F 1/13439
See application file for complete search history.

(56) References Cited

U.S. PATENT DOCUMENTS 4,135,789 A 1/1979 Hall
4,141,651 A 2/1979 Smith et al.
(Continued)

OTHER PUBLICATIONS

Response to European Office Action dated Jan. 12, 2015 for EP Appl. No. 13732664.1.
(Continued)

*Primary Examiner* — Paisley L Arendt
(74) *Attorney, Agent, or Firm* — Daly, Crowley, Mofford & Durkee, LLP (57) ABSTRACT

A transmissive liquid crystal (LC) control structure comprising: a superstrate (44) having a first surface (44a) having a GaN HEMT structure disposed thereon to provide a conductor on the first surface of said superstrate; a substrate (42) having a first surface disposed over and spaced apart from the first surface of said superstrate and having a GaN HEMT structure (43) disposed thereon to provide a conductor on the first surface of said substrate and wherein the GaN HEMT structure on one of the superstrate and substrate surfaces are patterned into individual electrodes; a polymer network liquid crystal (PNLC) (48) disposed in the space between the first surface of said superstrate and the first surface of said substrate; and a control circuit coupled to the individual electrodes.

10 Claims, 8 Drawing Sheets

(51) Int. Cl.

| | | |
|---|---|---|
| *G02B 6/42* | (2006.01) | |
| *G02F 1/1343* | (2006.01) | |
| *G02F 1/29* | (2006.01) | |
| G02F 1/137 | (2006.01) | |
| G02B 6/28 | (2006.01) | |

(52) U.S. Cl.
CPC ........ *G02F 1/134336* (2013.01); *G02F 1/292* (2013.01); *G02B 6/2821* (2013.01); *G02B 6/4286* (2013.01); *G02F 1/133365* (2013.01); *G02F 2001/13345* (2013.01); *G02F 2001/13775* (2013.01); *G02F 2001/133302* (2013.01); *G02F 2202/10* (2013.01)

(56) References Cited

U.S. PATENT DOCUMENTS

| | | |
|---|---|---|
| 4,229,106 A | 10/1980 | Dorschner et al. |
| 4,284,329 A | 8/1981 | Smith et al. |
| 4,418,102 A | 11/1983 | Ferrato |
| 4,482,249 A | 11/1984 | Smith, Jr. et al. |
| 4,525,028 A | 6/1985 | Dorschner |
| 4,545,650 A | 10/1985 | Kirkman et al. |
| 4,548,501 A | 10/1985 | Smith et al. |
| 4,684,219 A | 8/1987 | Cox et al. |
| 4,687,331 A | 8/1987 | Holz et al. |
| 4,695,490 A | 9/1987 | McClelland et al. |
| 4,813,766 A | 3/1989 | Keene et al. |
| 4,813,774 A | 3/1989 | Dorschner et al. |
| 4,818,087 A | 4/1989 | Dorschner |
| 4,882,235 A | 11/1989 | Resler |
| 4,943,709 A | 7/1990 | Grinberg et al. |
| 4,964,251 A | 10/1990 | Baughman et al. |
| 4,964,701 A | 10/1990 | Dorschner et al. |
| 5,004,343 A | 4/1991 | Dorschner et al. |
| 5,018,835 A | 5/1991 | Dorschner |
| 5,084,898 A | 1/1992 | Dorschner et al. |
| 5,093,740 A | 3/1992 | Dorschner et al. |
| 5,093,747 A | 3/1992 | Dorschner |
| 5,126,869 A | 6/1992 | Lipchak et al. |
| 5,151,814 A | 9/1992 | Grinberg et al. |
| 5,216,729 A | 6/1993 | Berger et al. |
| 5,233,673 A | 8/1993 | Vali et al. |
| 5,241,995 A | 9/1993 | Farrell |
| 5,246,042 A | 9/1993 | Farrell |
| 5,253,033 A | 10/1993 | Lipchak et al. |
| 5,276,747 A | 1/1994 | Pan |
| 5,309,263 A | 5/1994 | Sato |
| 5,333,046 A | 7/1994 | Smith et al. |
| 5,363,228 A | 11/1994 | DeJule et al. |
| 5,404,365 A | 4/1995 | Hiiro |
| 5,412,475 A | 5/1995 | Smith et al. |
| 5,559,619 A | 9/1996 | Sato |
| 5,740,288 A | 4/1998 | Pan |
| 5,963,682 A | 10/1999 | Dorschner et al. |
| 6,013,339 A | 1/2000 | Yamada et al. |
| 6,099,970 A | 8/2000 | Bruno et al. |
| 6,103,604 A | 8/2000 | Bruno et al. |
| 6,246,369 B1 | 6/2001 | Brown et al. |
| 6,282,224 B1 | 8/2001 | Smith et al. |
| 6,473,148 B1 | 10/2002 | Suh |
| 6,490,076 B2 | 12/2002 | Pepper |
| 6,545,563 B1 | 4/2003 | Smith |
| 6,597,836 B2 | 7/2003 | Johnson et al. |
| 6,673,497 B2 | 1/2004 | Efimov et al. |
| 6,704,474 B1 | 3/2004 | Dorschner et al. |
| 6,710,736 B2 | 3/2004 | Fullerton et al. |
| 6,810,164 B2 | 10/2004 | Dorschner et al. |
| 6,861,270 B2 | 3/2005 | Sakai |
| 6,884,647 B2 | 4/2005 | Sakai et al. |
| 6,908,026 B2 | 6/2005 | Hanna et al. |
| 6,974,517 B2 | 12/2005 | Hanna |
| 6,988,338 B1 | 1/2006 | Chen et al. |
| 7,005,685 B2 | 2/2006 | Sakai et al. |
| 7,006,747 B2 | 2/2006 | Escuti et al. |
| 7,015,511 B2 | 3/2006 | Sakai et al. |
| 7,046,326 B2 | 5/2006 | Austin et al. |
| 7,095,925 B2 | 8/2006 | Grunnet-Jepson et al. |
| 7,166,182 B2 | 1/2007 | Pereira et al. |
| 7,196,758 B2 | 3/2007 | Crawford et al. |
| 7,215,472 B2 | 5/2007 | Smith et al. |
| 7,226,850 B2 | 6/2007 | Hoke et al. |
| 7,352,428 B2 | 4/2008 | Anderson et al. |
| 7,355,671 B2 | 4/2008 | Anderson et al. |
| 7,365,369 B2 | 4/2008 | Nakamura et al. |
| 7,428,100 B2 | 9/2008 | Smith et al. |
| 7,557,378 B2 | 7/2009 | LaRoche et al. |
| 7,570,310 B2 | 8/2009 | Harada et al. |
| 7,692,759 B2 | 4/2010 | Escuti et al. |
| 7,848,370 B2 | 12/2010 | Kewitsch et al. |
| 7,889,767 B2 | 2/2011 | Betin et al. |
| 7,990,600 B2 | 8/2011 | Sachs et al. |
| 8,268,707 B2 | 9/2012 | Resler et al. |
| 2001/0033400 A1 | 10/2001 | Sutherland et al. |
| 2002/0186919 A1 | 12/2002 | Pepper |
| 2004/0135956 A1 | 7/2004 | Kim et al. |
| 2005/0018954 A1 | 1/2005 | Vinouze et al. |
| 2005/0031264 A1 | 2/2005 | Volodin et al. |
| 2005/0069245 A1 | 3/2005 | Mitchell et al. |
| 2006/0033995 A1 | 2/2006 | Smith et al. |
| 2006/0210219 A1 | 9/2006 | Takahashi et al. |
| 2007/0014517 A1 | 1/2007 | Rizoiu et al. |
| 2008/0129945 A1 | 6/2008 | Kim |
| 2009/0029071 A1 | 1/2009 | Nakayama et al. |
| 2009/0044496 A1 | 2/2009 | Botelho et al. |
| 2009/0142073 A1 | 6/2009 | Smith et al. |
| 2010/0320474 A1 | 12/2010 | Resler et al. |
| 2012/0081621 A1 | 4/2012 | Dorschner et al. |
| 2014/0268328 A1 | 9/2014 | Dorschner et al. |

OTHER PUBLICATIONS

Response to New Zealand Office Action filed on Sep. 22, 2015 for Appl. No. 702327; 64 pages.
Response to Australian Office Action filed on Nov. 2, 2015 for Appl. No. 2013266159; 45 pages.
U.S. Appl. No. 14/780,580, filed Sep. 28, 2015, Collins.
PCT International Preliminary Report on Patentability of the ISA dated Dec. 3, 2015 for Appl. No. PCT/US2013/042638; 8 pages.
Examiner's Report dated Nov. 27, 2015 for Appl. No. 2,874,616; 4 pages.
Further Examination Report dated Oct. 20, 2015 for New Zealand Appl. No. 702327; 2 pages.
Voluntary Amendment for Australian Patent Application No. 2013389971 dated Dec. 24, 2015; 8 pages.
Response to Oct. 20, 2015 Further Examination Report as filed on Jan. 19, 2016 for New Zealand Appl. No. 702327; 61 pages.
Voluntary Amendment as filed Feb. 15, 2016 for New Zealand Appl. No. 713761; 19 pages.
Further Examination Report Postponed Acceptance dated Feb. 5, 2016 for New Zealand Appl. No. 702327; 1 page.
Crawford, et al.; "Internal surface, orientational order, and distribution of a polymer network in a liquid crystal matrix;" Physicai Review E; Rapid Communications; The American Physical Society; vol. 52; No. 2; Aug. 1995; pp. R1273-R1276.
Dorschner; "Adaptive Photonic Phase Locked Elements;" An Overview; DARPA/MTO Symposium; Mar. 2007; pp. 1-15.
Kim, et al.; "Wide-angle, nonmechanical beam steering using thin liquid crystal polarization gratings;" Proc. Of SPIE; vol. 7093; Jan. 2008, pp. 1-12.
McManamon, et al.; "A Review of Phased Array Steering for Narrow-Band Eiectrooptical System;" Proceeding of the IEEE; vol. 97; No. 6; Jun. 2009; pp. 1078-1096.
McManamon, et al., "Optical Phased Array Technology;" Proceedings of the IEEE; vol. 84; No. 2; Feb. 1996; pp. 268-298.
Miller; Self-aligning universal beam coupler; Optics Express; vol. 21; No. 5; Mar. 11, 2013; pp. 6360-6370.
Nicolescu, et al.; "Polarization-independent tunable optical filters based on liquid crystal polarization gratings;" Proceedings of SPIE; vol. 6654; No. 665405; Aug. 2007; 12 pages.

(56) References Cited

OTHER PUBLICATIONS

Rockwell, et al.; "Semi-guiding high-aspect-ratio-core (SHARC) fiber providing single-mode operation and an ultra-large core area in a compact coliable package;" Optics Express; vol. 19; No. 15; Jul. 18, 2011; pp. 14746-14762.
International Preliminary Report on Patentability of the ISA for PCT/US2011/054245 dated Apr. 11, 2013.
Office Action dated Feb. 21, 2013 from U.S. Appl. No. 13/250,111.
Partial PCT Search Report received with Invitation to Pay Additional Fees in PCT/US2011/054245 dated Jan. 18, 2012.
PCT Search Report of the ISA for PCT/US2011/054245 dated Mar. 26, 2012.
Written Opinion of the ISA for PCT/US2011/054245 dated Mar. 26, 2012.
Response to Office Action dated Feb. 21, 2013 as filed on May 16, 2013 from U.S. Appl. No. 13/250,111.
Office Action dated Sep. 6, 2013 from U.S. Appl. No. 13/250,111.
Rule 161 Communication for Application No. 11770009.6 dated Jun. 12, 2013.
Response to Rule 161 Communication for Application No. 11770009.6 as filed on Dec. 23, 2013.
"Liquid crystal blazed-grating beam deflector," by Wang et al, Applied Optics, vol. 39, No. 35, pp. 6545-6555, 2000.
PCT Search Report of the ISA for PCT/US2013/042653 dated Nov. 7, 2013 6 pages.
Written Opinion of the ISA for PCT/US2013/042653 dated Nov. 7, 2013 9 pages.
PCT International Preliminary Report on Patentabty for PCT/US2013/042653 dated May 24, 2013 10 pages.
Fan et al.; "Fast-Response and scattering-free polymer network liquid crystals for infrared light modulators;" Applied Physics Letters; American Institute of Physics; vol. 64; No. 8; Feb. 23, 2004; pp. 1233-1235.
Ren et al.; "Tunable Microlens arrays using polymer network liquid crystal;" Optics Communications; Science Direct; Sep. 22, 2003; pp. 267-271.
PCT International Preliminary Report on Patentability for PCT/US2013/042646 dated May 24, 2013 6 pages.
PCT Search Report of the ISA for PCT/US2013/042646 dated Sep. 3, 2013 5 pages.
Written Opinion of the ISA for PCT/US2013/042646 dated Sep. 3, 2013 4 pages.
PCT Invitation to Pay Additional Fees for PCT/US2013/042641 dated Sep. 20, 2013 10 pages.
Gelissen et al.; "Polarization Control Using Nematic Liquid Crystals;" Advances in Optical Information Processing; Proceedings of SPIE vol. 4046; Apr. 25, 2000; pp. 118-129.
PCT Search Report of the ISA for PCT/US2013/042641 dated Jan. 30, 2014 9 pages.
Written Opinion of the ISA for PCT/US2013/042641 dated Jan. 30, 2014 9 pages.
PCT International Preliminary Report on Patentability for PCT/US2013/042641 dated Dec. 4, 2014 11 pages.
U.S. Appl. No. 13/250,111, filed Sep. 30, 2011.
U.S. Appl. No. 13/801,411, filed Mar. 13, 2013.
Kanghua Lu, et al.; "Theory and design of the liquid crystal TV as an optical spatial phase modulator;" 2417 Optical Engineering; vol. 29; No. 3; Mar. 1, 1990; pp. 240-246.
Karim, et al.; "Electrooptic Displays for Optical Information Processing;" Proceedings of the IEEE; vol. 84; No. 6; Jun. 1, 1996; pp. 814-827.
Office Action for Application No. 2013266159 dated May 26, 2015; 3 pages.
Office Action for Application No. 702327 dated Mar. 24, 2015.
Search Report of the ISA for PCT/US2013/042638 dated Sep. 17, 2013.
Written Opinion of the ISA for PCT/US2013/042638 dated Sep. 17, 2013.
First Examination Report dated Jun. 3, 2016 for New Zealand Application No. 713761; 5 pages.
First Examination Report dated Jun. 8, 2016 for Australian Application No. 2013389971; 3 pages.
Response to Aug. 12, 2016 Examiner's Report for Canadian Application No. 2,874,616 as filed on Sep. 28, 2016; 8 pages.
Response to Rule 161 EPC Communication filed on Jul. 13, 2016 for EP Application No. EP13727011.2.
Response to Examiner's Report dated Nov. 27, 2015 for Canadian Application No. 2,874,616 as filed on Jan. 28, 2016; 13 pages.
Examiner Report dated Aug. 12, 2016 for Canadian Application No. 2,874,616; 3 pages.
Canadian Office Action dated Oct. 26, 2016 for Canadian Application No. 2,910,592; 4 pages.
Australian Second Patent Examination Report dated Nov. 10, 2016 for Australian Appl. No. 2013389971; 3 pages.
New Zealand Further Examination Report dated Nov. 29, 2016 for New Zealand Appl. No. 713761; 4 pages.
Response to First Examination Report dated Jun. 3, 2016 for New Zealand Application No. 713761; as filed on Oct. 27, 2016; 2 pages.
Response to First Examination Report dated Jun. 8, 2016 for Australian Application No. 2013389971 as filed on Oct. 27, 2016; 21 pages.

LIQUID CRYSTAL CONTROL STRUCTURE, TIP-TILT-FOCUS OPTICAL PHASED ARRAY AND HIGH POWER ADAPTIVE OPTIC

CROSS REFERENCE TO RELATED APPLICATIONS

This application is a U.S. National Stage of PCT application PCT/US2013/042653 filed in the English language on May 24, 2013, and entitled "LIQUID CRYSTAL CONTROL STRUCTURE, TIP-TILT-FOCUS OPTICAL PHASED ARRAY AND HIGH POWER ADAPTIVE OPTIC," which claims the benefit of provisional application no. 61/651,440 filed May 24, 2012, which application is hereby incorporated herein by reference.

FIELD

The structures and techniques described herein relate to optical transmit receive systems and more particularly to free-space laser/optical transmit-receive systems.

BACKGROUND

As is also known in the art, optical phased arrays (OPAs) allow electronic steering of lightwave beams with no moving parts. However, conventional OPAs have insertion loss and beam scanning speed characteristics which make them inappropriate for use in certain applications including directed energy applications, for example.

As is also known, advanced laser beam control by non-mechanical means is not currently used. Beam steering is typically done with mechanical 'fast steering mirrors' that are limited to bandwidths barely exceeding 1 kHz and agile switching times of several milliseconds. The performance of such mechanical beam steering systems seriously limits the degree of stabilization obtainable in electro-optic (EO) systems of all power levels. Such millisecond speeds are also inadequate for new applications, such as multi-target laser designation in which it is desirable to target substantially simultaneously multiple swarming vehicles (e.g. boats).

A recent DARPA development program, Adaptive Photonically Phase-Locked Elements (APPLE), aimed to improve the performance of non-mechanical beamsteering. Systems analyses of an APPLE beam director using standard optical phased arrays show scanning speeds and loss characteristics which are not suitable for desired applications. For example APPLE Phase 1 hardware using standard OPAs has a fill factor of about 0.4, which implies that only about 16% of the energy is coherently combined on a target. Furthermore, standard OPAs have a form factor that limit the fill factor of arrays of modules. Thus, in view of the above, it is understood that conventional fast steering mirrors are inadequate in all respects, and existing OPAs are only somewhat better.

SUMMARY

In accordance with the concepts, systems, components and techniques described herein, a transmissive liquid crystal (LC) control structure includes a superstrate having a first surface having a GaN HEMT structure disposed thereon to provide a conductor on the first surface of the superstrate, a substrate having a first surface disposed over and spaced apart from the first surface of the superstrate and having a GaN HEMT structure disposed thereon to provide a conductor on the first surface of the substrate and wherein the GaN HEW structure on one of the superstrate and substrate surfaces are patterned into individual electrodes, a polymer network liquid crystal (PNLC) disposed in the space between the first surface of the superstrate and the first surface of the substrate and a control circuit coupled to the individual electrodes.

In one embodiment, the structure further includes a flex circuit having conductors disposed thereon and having a first end electrically coupled to the control circuit and a second end disposed over and coupled to the individual electrodes.

In one embodiment, the flex circuit is provided as an anisotropic conductive film (ACF) flex circuit having ACF disposed to provide an electrical signal path between conductors on the second end of the flex circuit and the individual electrodes.

In one embodiment, the structure is provided to form an adaptive optic comprising an array of pixels, wherein each one of at least three of the pixels is adjacent to at least three other pixels.

In one embodiment, the substrate is provided as one of: a sapphire substrate; or a spinel substrate.

In one embodiment, the structure is provided to form a first optical phased array (OPA).

In one embodiment, the structure is provided to form a second OPA disposed relative to the first OPA such that the steering angles of the first and second OPAs are different.

In one embodiment, the structure further comprises a second OPA disposed relative to the first OPA such that the steering angles of the first and second OPAs are substantially orthogonal.

In accordance with a further aspect of the concepts, systems, components and techniques described herein, a tip-tilt focus optical phased array includes a first optical phased array comprising a superstrate having a first surface comprising a GaN HEMT layer; a substrate having a first surface comprising a GaN HEMT layer patterned into one of more electrodes with the first surface of the substrate disposed over and spaced apart from the first surface of the superstrate, a polymer network liquid crystal disposed between the first surface of the superstrate and the first surface of the substrate to form a liquid crystal cell; and a second optical phased array comprising: a superstrate having a first surface comprising a GaN HEMT layer; a substrate having a first surface comprising a GaN HEMT layer patterned into one of more electrodes with the first surface of the substrate disposed over and spaced apart from the first surface of the superstrate; a polymer network liquid crystal disposed between the first surface of the superstrate and the first surface of the substrate to form a liquid crystal cell, the first and second OPAs arrange such that the one or more electrodes in the first OPA are substantially orthogonal to the one or more electrodes in the second OPA.

In accordance with a still further aspect of the concepts, systems, components and techniques described herein, an adaptive optic includes a first optical phased array comprising: a two-dimensional array of pixels each of the pixels provided from a liquid crystal cell comprising: a superstrate having a first surface comprising a GaN HEMT layer; a substrate having a first surface comprising a GaN HEMT layer patterned into one of more electrodes with the first surface of the substrate disposed over and spaced apart from the first surface of the superstrate; a polymer network liquid crystal disposed between the first surface of the superstrate and the first surface of the substrate to form a liquid crystal cell; and a second optical phased array comprising: a two-dimensional array of pixels each of the pixels provided from a liquid crystal cell comprising: a superstrate having a first surface with a GaN HEMT layer disposed thereon; a substrate having first and second opposing surfaces, the substrate having a relatively high thermal conductivity characteristic; one or more GaN HEMT layers disposed over the first surface of the substrate, the one or more GaN HEMT layers providing one or more electrodes; a polymer network liquid crystal disposed between the first surface of the superstrate and the first surface of the substrate, the first and second OPAs arrange such that the electrodes in the first OPA are substantially orthogonal to the electrodes in the second OPA.

In accordance with a still further aspect of the concepts, systems, components and techniques described herein, a tip/tilt/focus optical phased array (TTFOPA) includes a polymer network liquid crystal (PNLC) material disposed between a superstrate and a substrate comprising a gallium nitride high electron mobility transistor (GaN HEMT) electrode layer to form a liquid crystal (LC) cell. The gallium nitride (GaN) based optically transparent conducting layer (i.e. the GaN HEMT structure) has a number of electrodes which is reduced compared with prior art approaches. The TTFOPA further includes an anisotropic conductive film (ACE) which connects a flex circuit interconnect system having control lines disposed thereon to corresponding control pads on the TTFOPA to provide control signals to the electrodes on the GaN based optically transparent conductive film from an off-the-glass driver circuit.

With this particular arrangement, a relatively fast TTFOPA capable of high power operation is provided. In one embodiment, a TTFOPA having a scanning speed 100 times faster than the best known fast steering mirror and a loss characteristic suitable for use in applications requiring high switching speeds is provided. Use of a PNLC material results in a TTFOPA having scanning speeds suitable for applications which require relatively high scanning speeds. The PNLC material, however, requires a switching voltage on the order of 100V to switch phase and conventional drivers in existing chip-on-glass optical phased array (OPA) drive technology are not capable of providing such switching voltage levels. Consequently, an off-the-glass drive technique is used for TTFOPAs utilizing PNLC material. Due to the relatively high voltage levels which must be applied to conductors in order to control the PNLC material, a reduced number of electrodes is used in the TTFOPA to thus prevent breakdown between closely spaced OPA electrodes. Reducing the number of electrodes in turn reduces the number of control lines required to provide control signals to each electrode to the TTFOPA. The control voltages needed to drive a fast device must themselves be fast. When such wideband signals are applied to an OPA electrode, avoiding RC drops along the length of the electrode requires fairly low resistivity material. A standard electrode material cannot provide both low resistivity and low optical absorption. Thus, the electrodes are provided from a two-dimensional electron gas (2DEG) layer formed in a substrate comprising a gallium nitride/aluminum gallium nitride (GaN/AlGaN) stack. Furthermore, providing a requisite number of control lines onto the device requires use of an anisotropic conductive film (ACF) to support fine-pitch interconnects between the control circuitry and the OPA electrodes.

The TTFOPA utilizes a gallium-nitride (GaN) based transparent conducting thin film for addressing owing to its having higher conductivity at acceptable optical loss levels. The increased conductivity is necessary to support the much faster switching waveforms (whereas RC voltage drops along the electrodes with standard. InOx coatings are unacceptable). As a result, the TTFOPA described herein is faster than the best known fast steering mirror, solving longstanding scan speed and associated scan loss issues. The TTFOPA described herein is the only device known to be able to satisfy the requirements of applications utilizing multi-target designation.

In accordance with as further aspect of the concepts, systems, components and techniques described herein, an optical phased array (OPA) that is designed to steer over a restricted field of regard (FoR), but to do so much faster, and with a more compact form factor than prior art approaches is described. The OPA comprises a plurality of elements with each of the elements comprising an adaptive optic, a TTFOPA, a course steering OPA and a polarization grating stack.

In one embodiment, the TTFOPA is designed for a nominal FoR of about 2 milliradians. Typical fine steering OPAs have previously been designed to steer over a few degrees, which requires a larger number of electrodes, from 256 up to over 1000. The TTFOPA described herein utilizes a reduced number of electrodes to thereby make direct addressing of each electrode practical; available technology for ACF and flex circuit interconnect technology is consistent with an electrode pitch of 0.1 to 0.2 mm and the device built accordingly has a 16 mm aperture with 95 electrodes.

The TTFOPA with PNLC material requires relatively high voltages (i.e. on the order of 100V), and current-technology on-glass application-specific integrated circuits (ASICs) with such output voltages are not readily available with the required number of outputs. By limiting the number of electrodes to be consistent with ACF flex circuit technology, we can utilize direct connection of high voltage lines from a controller/driver to each OPA electrode via an ACF/flex circuit interconnect.

The off-glass addressing approach results in a much more compact unit that is well suited for tight packing into high-fill factor arrays. This increases the "power in the bucket", i.e., the fraction of the optical power emitted from the array which falls into a single, compact beam as opposed to being distributed over a weaker single beam plus numerous sidelobes containing a significant fraction of the power. Such sidelobes power is usually not useful in a directed-energy application. The TTFOPA, when incorporated into a suitable array such as that described in WO 2012/044942 assigned to the assigned of the present application results in an power in the bucket increased by a factor of four for phased array systems.

Significant features of the TTFOPA described herein include, but are not limited to (1) use of a polymer network liquid crystal to get higher speed, despite its order of magnitude higher addressing voltage needs; (2) utilization of a deliberately restricted electrode count to avoid the need for voltage-limited chip-on-glass addressing technology; (3) a high voltage (100V) driver; (4) use of anisotropic conducting film (ACF) connect technology; (5) use of a two-dimensional electron gas layer (2 DEG) formed in a GaN/AlGaN HEMT structure (rather than use of a conventional indium oxide film). The TTFOPA is thus provided as a patterned electrode device utilizing PNLC. In one particular embodiment, GaN electrodes are used. By providing a TTFOPA comprising ACF and flex circuit interconnects without on-glass ASIC, an OPA which supports APPLE arrays having a fill factor of at least 0.8 is provided. This corresponds to over 60% power in the bucket. Furthermore, while conventional OPAs are capable of scanning at about 1 degree per second before sustaining intolerable loss levels, the tip-tilt focus OPAs (TTFOPAs) described herein are capable of scanning at a rate of about 20 degrees per second at the same loss levels, or at the same scan rate with only about 10% of the loss of standard OPA's.

In accordance with a further aspect of the concepts, systems, components and techniques described herein, an adaptive optic (AO) comprises a voltage-addressable, transmission-mode, liquid-crystal (LC) cell, having substrates patterned into an array of independent pixels to support two-dimensional (2-D) addressing for use as an AO actuator. The pattern and the attached addressing leadouts are disposed on a substrate to support high bandwidth operation. Such substrates are selected having a high thermal conductivity characteristic and are provided having ultra-low-loss transparent conducting thin films disposed thereon.

In one embodiment, the ultra-low-loss transparent conducting thin films are provided by means of epitaxial growth directly on the substrates of a Gallium Nitride (GaN) high electron mobility transistor (HEMT) structures suitably modified for optical transparency. In one embodiment, sapphire is a preferred substrate, but the substrates may also be provided from spinel or other materials. In general, substrates (in addition to sapphire and spinel) suitable for epitaxial growth of the structure and having appropriate optical characteristics and appropriate heat conducting characteristics may can also be used. A GaN process as described, for example, in U.S. Pat. No. 8,268,707 assigned to the Assignee of the present application, and customized for optical applications provides a relatively low loss transparent conductive coatings known. The low absorption losses reduce (or ideally minimize) the heat deposited in the actuator by an incident high power laser beam, and sapphire substrates conduct away what little is absorbed, leaving a clear aperture that is virtually free of thermal gradients and the corresponding wave-front errors that such gradients typically generate.

In one embodiment, one of the substrates is pixilated into an array of independent actuators by etching through the GaN HEMT structure. The cell is filled with a liquid crystal for (e.g. as polymer network liquid crystal (PNLC). PNLC structures have a switching speed approximately one hundred (100) times faster than classic nematic materials used in prior art components.

The PNLC requires a driving voltage of the order of 100 V which is a much higher driving voltage level than that required by prior art materials. Consequently, a GaN deposition process, driver circuit design, and selection of off-glass addressing are selected for the particular application described herein.

In one embodiment, the AO pixels are provided having a selected shape, but the pixels may be provided having any shape including but not limited to square and hexagonal shapes. The particular pixel shape to use in any application is selected based upon a variety of factors including, but not limited to the shape of the beams with which the AO is intended to be used (e.g. pixels having a square cross-sectional shape better support use of an AO with square overall shape (clear aperture)).

With this particular arrangement, an adaptive optic capable of operating in a transmission mode (rather than a reflective mode, as in prior art device) is provided. Operating in a transmission mode allows the AO to be more conveniently integrated into an optical system. In one embodiment, the AO operates at a settling time of 50 µs or less. An LC device has better power handling than a thin MEMS of fast-steering mirror because it can be conductively cooled by having a structure which does not have to be very thin and lightweight. This is true of a transmissive device on a high-conductivity substrate but even more true of a reflective OPA device, which may be cooled by contact to the unused rear face. Fast settling time is a characteristic provided by the PNLC.

Furthermore, transmission mode operation of adaptive optics in accordance with the concepts, systems, components and techniques described herein result in an AO having no measureable interactuator coupling (as compared, for example, to MEMS-based devices having interactuator coupling of about 13% which is the smallest known interactuator coupling value in an adaptive optic).

The adaptive optic actuator comprises a combination of new technologies, namely: (1) the use of sapphire, spinel, or other substrates having a relatively high thermal conductivity characteristic; (2) the use of GaN HEMT layers as transparent conductive thin films; (3) the use of electrode connection means which enable the requirement of high voltage addressing for the PNLC to be satisfied; a unique processes for deposition of the GaN HEMT layers (due to the requirement of high voltage addressing for the PNLC); and (4) a process for forming a of conductors while maintaining high breakdown voltage.

BRIEF DESCRIPTION OF THE DRAWINGS

The foregoing features of the circuits and techniques described herein, may be more fully understood from the following description of the drawings in which.

DETAILED DESCRIPTION OF THE PREFERRED EMBODIMENTS

Figure 1:
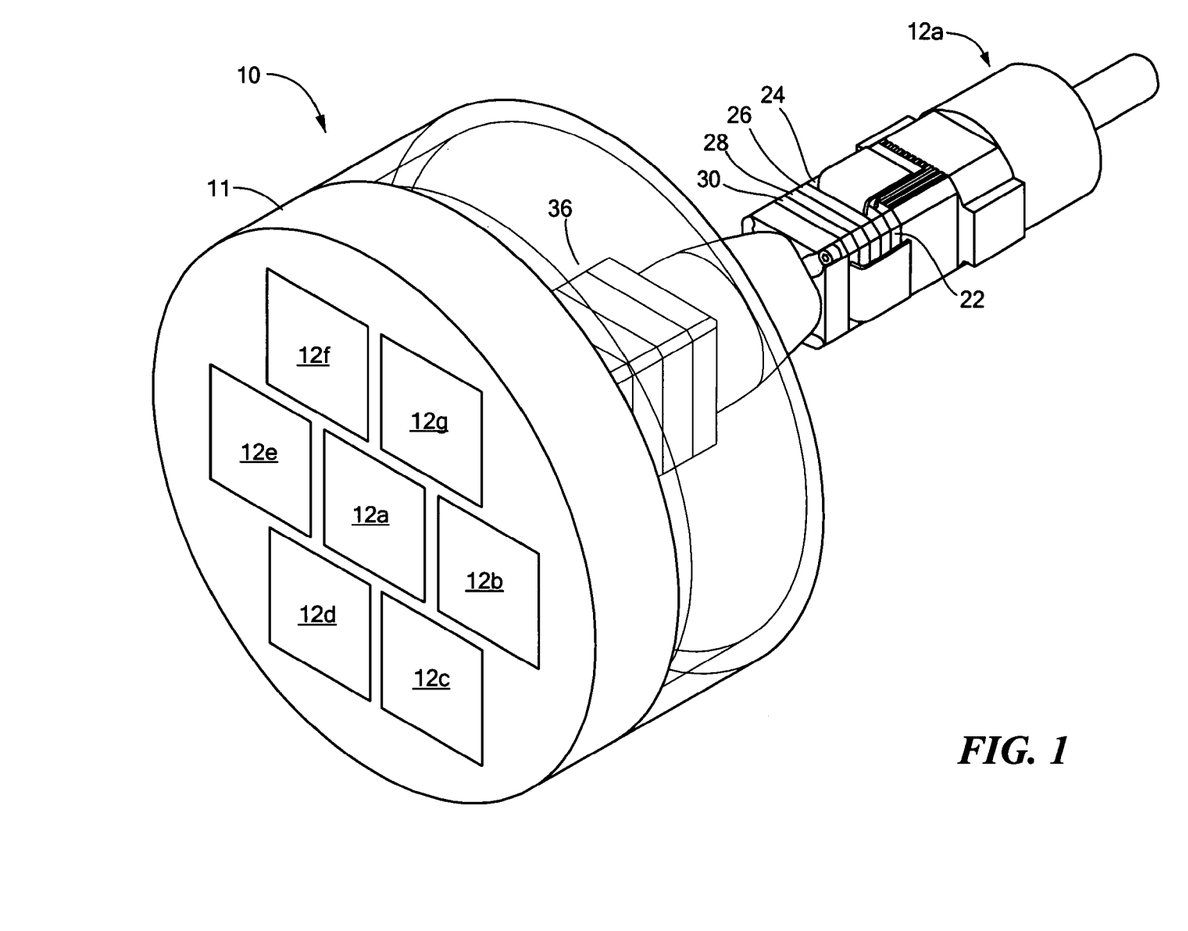
FIG. 1 is an isometric view of an array of adaptive photonics phase-locked elements (APPLE)

Referring now to FIG. 1, an optical array 10 is provided from a plurality of optical modules 12a-12g (or "array elements" or more simply "elements" or "apertures") disposed in a housing 11 portions of which are illustrated as being transparent. To promote clarity in the figure and text only seven modules 12a-12g is shown in FIG. 1. The modules will be described in detail in conjunction with FIG. 2 below. As will become apparent from the description below, array 10 is provided having fast, precise, all electronic fine-angle and focus beam control. Such an array finds use in a wide variety of applications including, but not limited to directed energy and communications application.

Figure 2:
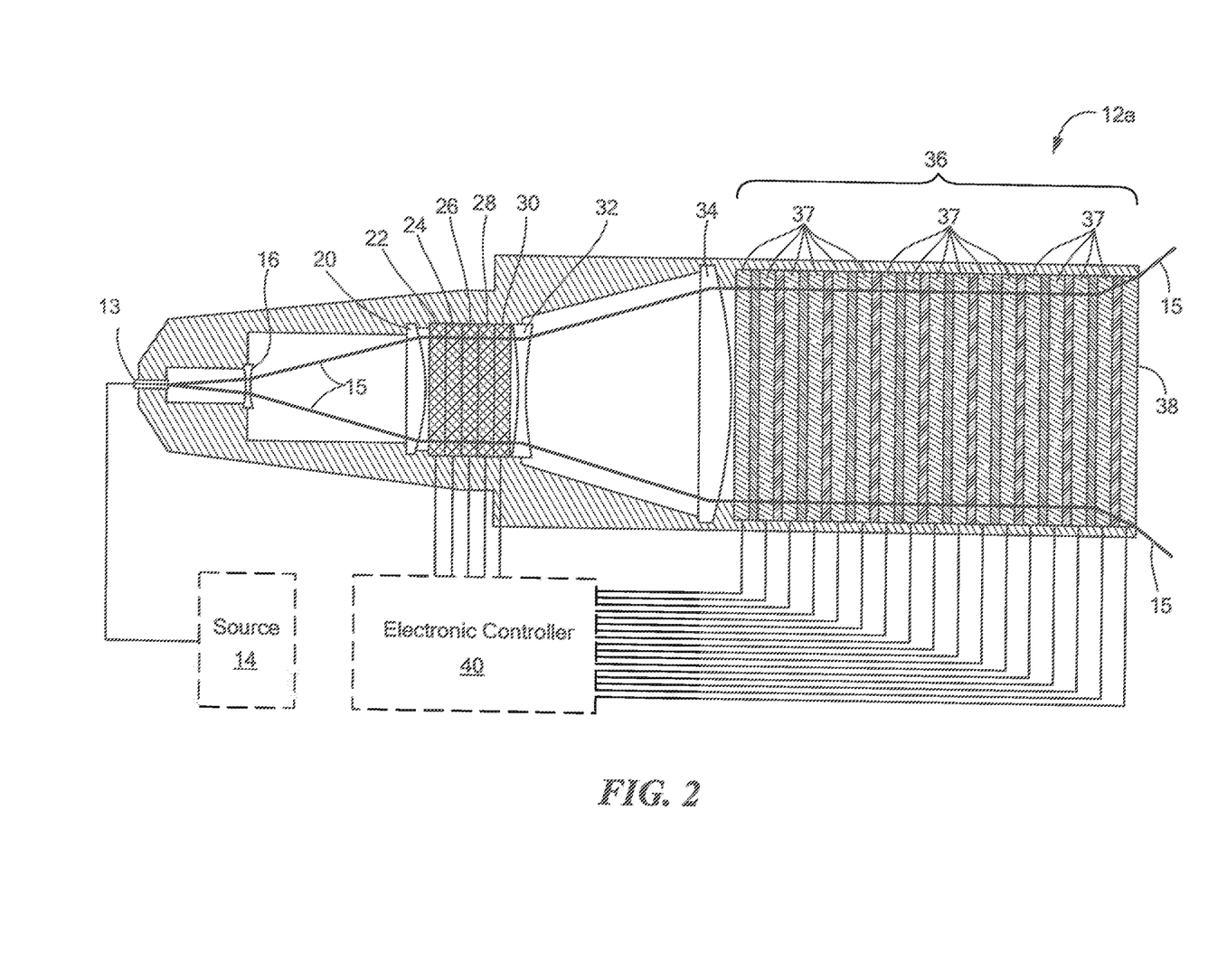
FIG. 2 is a block diagram of one element of the array of FIG. 1 which includes an adaptive optic (AO) and a tip/tilt/focus optical phased array (TTFOPA) provided from PNLC material and patterned GaN electrodes.

Referring now to FIG. 2, and taking element 12a as representative of elements 12a-12g in array 10 (FIG. 1), element 12a includes a fiber point feed 13 which accepts a signal (e.g. a laser signal) from a source 14. Source 14 is here shown in phantom since it is not properly a part of element 12a. Feed 13 is here provided as a fiber signal path capable of receiving a laser signal from source 14. An optical signal (e.g. light propagating through the element and represented with reference numeral 15 in FIG. 2) propagates through a pair of lenses 16, 20 and is incident upon adaptive optic 22, tip-tilt focused optical phased arrays (TTFOPAs) 24, 26 and a pair of coarse optical phased arrays (COPA) 28, 30 which provide a coarse steering portion. The coarse steering portion is provided from a plurality, here two, OPA, devices and AO portion is provided from one AO device although in other embodiments, as plurality of AO devices may be used. TTFOPA is provided from a plurality, here two, OPA devices.

Light propagates from COPAs 28, 30 toward a lens 32 (provided to start the light diverging again to provide a larger beam (better fill factor) at the output) and subsequently to a lens 34 and polarization grating stack 36 prior to exiting the element aperture through liquid crystal (LC) waveplate 38. PG stack 36 comprises at least one liquid crystal (LC) waveplate generally denoted 37. An electronic controller 40 provides control signals to each LC plate 37, 38.

The PG stack may be provided as the type described in U.S. patent application Ser. No. 13/250,111 filed on Sep. 30, 2011 and assigned to the assignee of the present application. In one embodiment, PG stack comprises a plurality of binary stages with each stage comprising at least one OPA device and a passive PG. In an alternate embodiment, PG stack may include one or more active liquid crystal half wave plates (LCWHPs). In one embodiment PG stack comprises a plurality of binary stages, with each of the binary stages comprising at least one liquid crystal wave plate (LCWP) and at least one polarization grating wherein each stage provides a selectable deflection angle. Significantly, the stages are arranged in order of increasing deflection angle magnitude such that the stage with the largest deflection angle magnitude is nearest the aperture output. In general, the deflection angle magnitudes and number of stages N in the PG stack are selected to provide a desired field of regard (FoR).

It should be appreciated that if the element need only scan over small scan angles, then the COPA and PG stack may be omitted from the element. For large scan angles, however, the COPA and TTFOPA are used in combination. To achieve the largest scan angles the COPA, TTFOPA and PG stack are used in combination a shown in FIG. 2. It should also be appreciated that the order in which the AO, COPA and TTFOPA are arranged may be changed (e.g. reversed or interleaved).

The PG stack provides two-dimensional angular control of an optical signal provided thereto. To provide such two-dimensional angular control, at least some of the plurality of binary stages in PG stack corresponding to a first set of PG stages direct an incident beam through angles lying substantially in a first plane and at least some of the plurality of binary stages in the PG stack correspond to a second set of PG stages which direct an incident beam through angles lying in a second different plane lying at an angle relative to the first plane. The first and second planes may or may not be orthogonal to each other. Thus, a wide range of two-dimensional angular control is available. Significantly, at least some of the stages of the first set are interleaved with at least some of the stages of the second set. In one embodiment each of the binary stages in PG stack corresponding to the first set of stages is adjacent to at least one of the binary stages in PG stack corresponding to the second set of stages.

The PG stack comprises a first plurality or set of binary stages for a first steering direction and a second plurality or set of binary stages, for a second different steering direction.

Thus PG stack enables steering in two dimensions. The steering directions may correspond to two orthogonal directions (e.g. azimuth and elevation) or non-orthogonal directions.

In one embodiment, each of the binary stages in the PG portion comprises at least one liquid crystal wave plate (LCWP) (OPA devices) and at least one polarization grating. Each stage thus provides a selectable deflection angle and the stages are arranged in order of increasing deflection angle magnitude such that the stage with the largest deflection angle magnitude is nearest the aperture output. In this exemplary embodiment the angle of deflections provided by the stage of PG stack may be on the order of $\pm 0.125°\pm 0.25°$, $\pm 0.5°$, $\pm 1.0$, $+2.0o$, $\pm 4.0o$, $\pm 8.0o$, $\pm 16.0o$. In other exemplary embodiments, the angle of deflections provided by the stage of PG stack may be on the order of $\pm 0.25°$, $\pm 0.5°$, $\pm 1.0$, $\pm 2.0o$, $\pm 4.0o$, $\pm 8.0o$, $\pm 16.0o$. Other deflection angle magnitudes may, of course, also be used. In general, the deflection angle magnitudes and number of stages in the PG stack are selected to provide a desired field of regard (FoR).

In one embodiment, the first set of stages are interleaved with the second set of stages. The number of stages in the first set need not be equal to the number of stages in the second set. Also, the deflection angle magnitude provided by the first set need not be equal to the deflection angle magnitude in the second set. In one embodiment, each of the binary stages in the PG stack corresponding to the first set of stages is adjacent to at least one of the binary stages in PG stack corresponding to the second set of stages.

With the architecture illustrated in FIG. 2, an optical aperture may be provided having a fixed feed-point which allows the system to be fed by fixed fiber lasers and/or by free space lasers. As will be discussed below, the element comprises a complex (patterned electrode) TTFOPA device provided using PNLC and in which each electrode in the TTFOPA is addressable.

Figure 3:
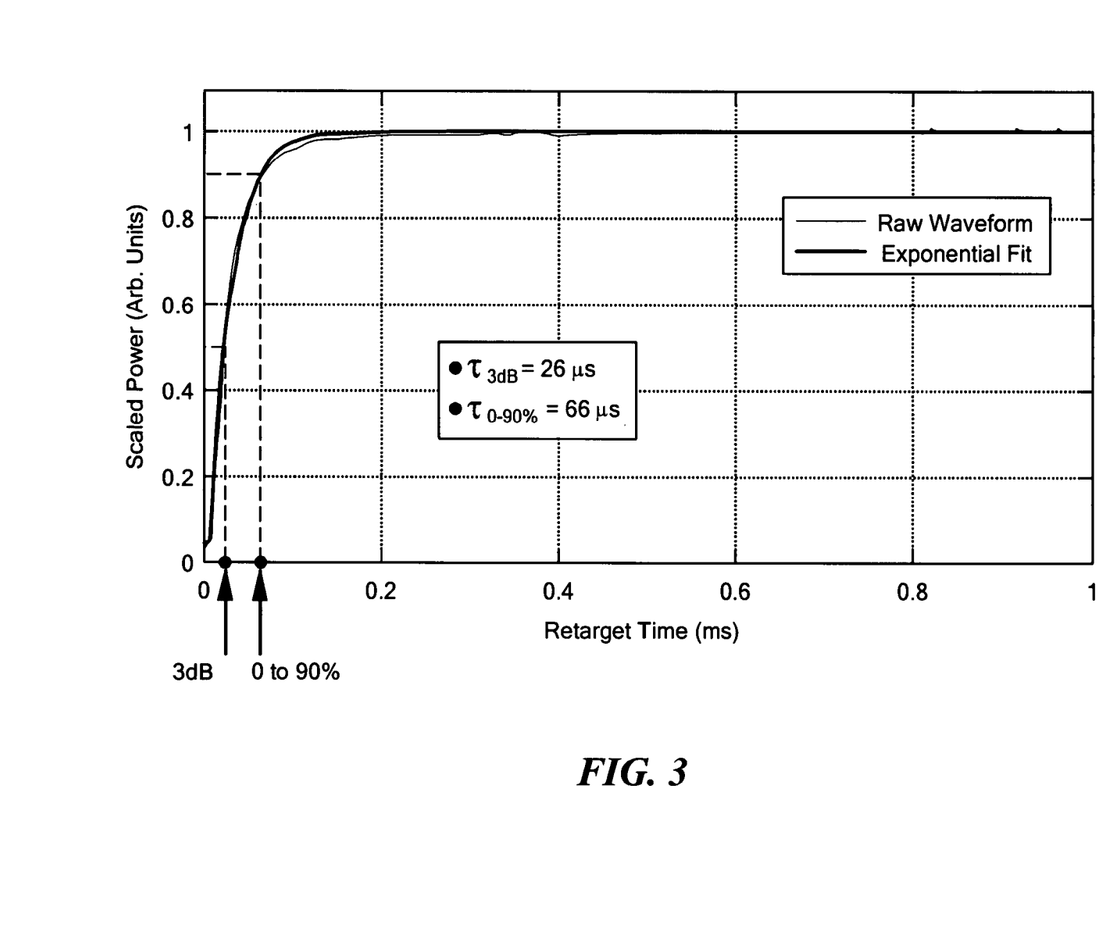
FIG. 3 is a plot of scaled power vs. re-target time which illustrates the settling time of a TTFOPA.

Referring now to FIG. 3, a plot of scaled power vs. re-target time illustrates that the use of TTFOPA's provided in accordance with the components, materials, and techniques described herein results in a system which is able to steer in an amount of time which is significantly faster than that achievable using prior art TTFOPAs.

Figure 4:
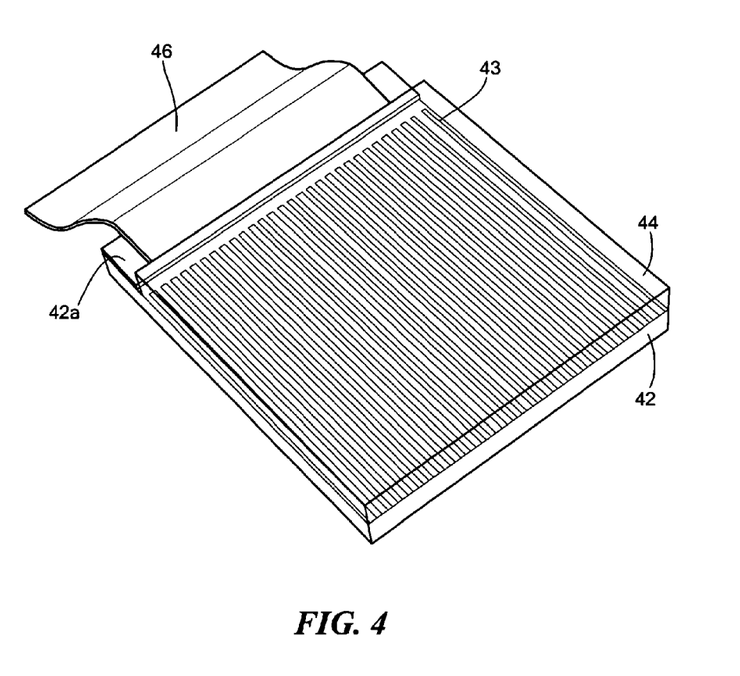
FIGS. 4 and 4A are isometric views of an optical element of a TTFOPA.
Figure 4A:
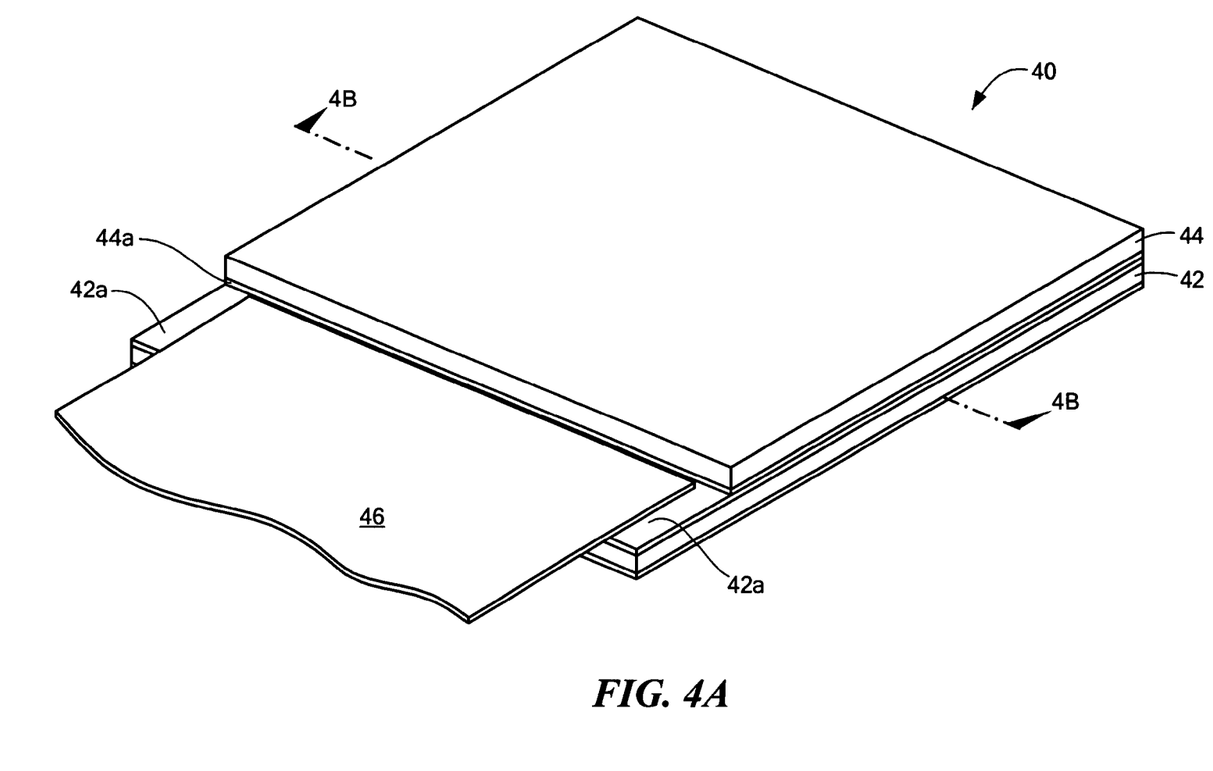
Figure 4B:
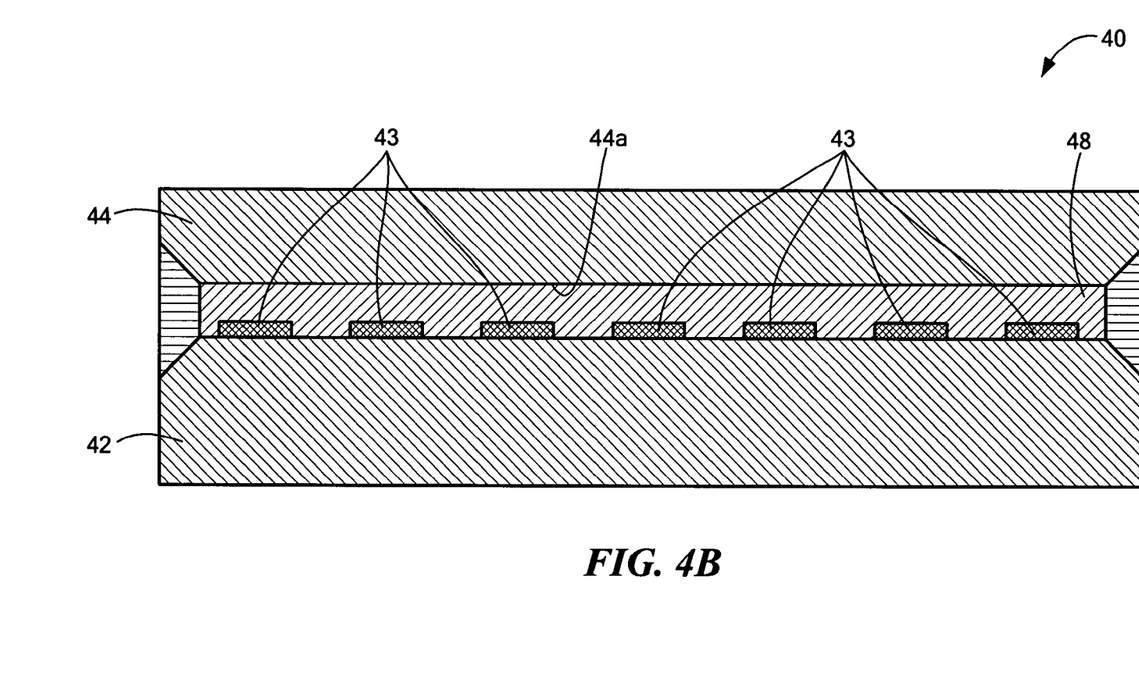
FIG. 4B is cross sectional view of the optical element of FIG. 4A taken across lines 4B-4B in FIG. 4A.

Referring now to FIGS. 4-4B in which like elements are provided having like reference designations, an OPA 40 which may be the same as or similar to OPAs 24, 26 described above in conjunction with FIG. 2 includes a substrate 42 having GaN electrodes 43 disposed thereon. A superstrate 44 is disposed over the substrate to form a cavity Which is filled with PNLC (not explicitly shown here). Superstrate surface 44a (FIG. 4B) also has a GaN conductor disposed thereon and a polymer network liquid crystal 48 (FIG. 4B) is disposed in the cavity to form a liquid crystal (LC) cell.

A flex circuit 46 has a first end coupled to a controller (not shown, but which may be the same as or similar to controller 40 in FIG. 2) and a second end electrically coupled to the GaN electrodes 43 via an anisotropic conductive film (ACF) disposed on a surface of substrate 42a below the flex connector 46. Thus, the OPA includes a combination of a polymer network liquid-crystal (PNLC) material, an AlGaN/GaN substrate with Gan HEMT electrodes and a flex circuit coupled to the GaN electrodes via an ACT material.

Figure 5:
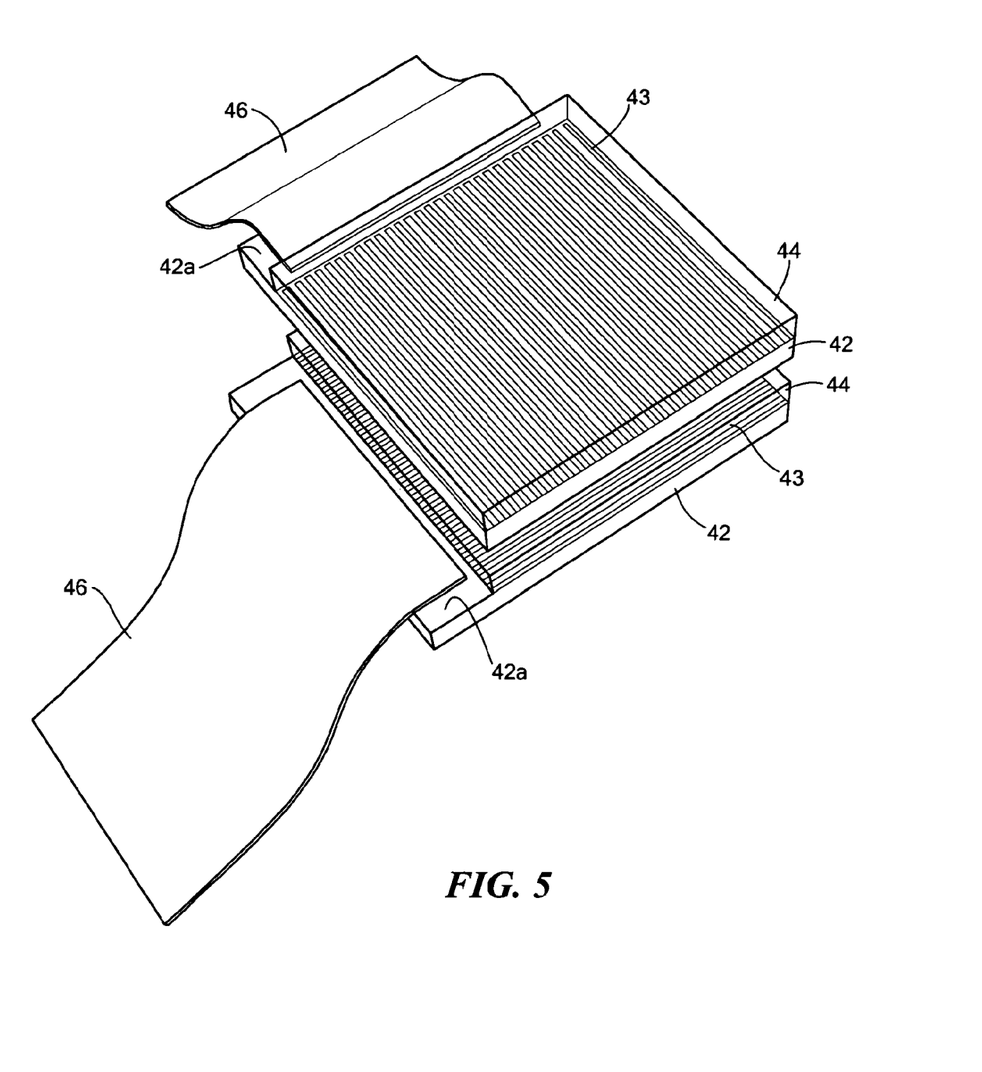
FIG. 5 is an isometric view of a pair of OPAs configured as a TTFOPA.

Referring now to FIG. 5, a pair of OPAs which may be the same as or similar to OPAs 24, 26 described above in conjunction with FIGS. 2 and 4-4B, are disposed such that electrodes in a first one of the OPAs are substantially orthogonal to electrodes in the second OPA to provide a tip-tilt focus optical phased array (TFOPA).

In one embodiment, the TTFOPA is designed for a nominal FoR of about 2 milliradians. Typical fine steering OPAs have previously been designed to steer over a few degrees, which requires a larger number of electrodes, from 256 up to over 1000. The TTFOPA described herein utilizes a reduced number of electrodes to thereby make direct addressing of each electrode practical; available technology for ACF and flex circuit interconnect technology is consistent with an electrode pitch of 0.1 to 0.2 mm and the device built accordingly has a 16 mm aperture with 95 electrodes The tip/tilt/focus optical phased array (TTFOPA) comprises a polymer network liquid crystal (PNLC) material, a gallium nitride (GaN) based optically transparent conducting film having electrodes disposed thereon as well as an anisotropic conductive film (ACF) flex circuit interconnect system which utilizes ACF to electrically couple a control line conductors provided on a flex circuit to corresponding control pads on the TTFOPA to provide control signals to the electrodes on the GaN based optically transparent conductive film from an off-the-glass driver circuit.

By utilizing PNLC material the TTFOPA is provided having scanning speeds which are relatively fast compared with scanning speeds of prior art devices. The PNLC material requires 100V to switch phase, which is not available in existing chip-on-glass OPA drive technology and consequently an off the glass drive technique is used. Providing the requisite number of lines onto the device requires use of ACF to support the very fine-pitch interconnect. The control voltages needed to drive a fast device must themselves be fast. When such wideband signals are applied to an OPA electrode, avoiding RC drops along the length of the electrode requires fairly low resistivity material. A standard electrode material cannot provide both low resistivity and low optical absorption. Thus, a new material for the electrodes, 2DEG formed in a GaN/AlGaN HEMT structure, is used.

The TTFOPA is filled with a polymer network liquid crystal (PNLC) which switches much faster than the typical nematic liquid crystal, but requires an order of magnitude higher voltage to do so, typically about 100V.

The TTFOPA is designed for a nominal FOR of about 100 microradians. Typical fine steering OPAs have previously been designed to steer over a few degrees, which requires many more electrodes; we limited the electrode count to make direct addressing practical.

The TTFOPA is designed to handle the higher voltages by limiting the number of electrodes and abandoning the usual chip-on-glass addressing with ASICs and instead using direct connection of high voltage lines to each electrode with a new ACF interconnect means.

The TTFOPA uses a GaN-based transparent conducting thin film for addressing owing to its having higher conductivity at acceptable optical loss levels. The increased conductivity is necessary to support the much faster switching waveforms; the RC voltage drops along the electrodes with standard InOx coatings would have been unacceptable.

Providing a TTFOPA having a PNLC, a deliberately restricted electrode count, off glass addressing an ACF connect and OPA electrodes provided via a 2DEG layer formed in a GaN/AlGaN stack results in a TTFOPA which is 100 times faster than the best known fast steering mirror, solving the scan speed and associated scan loss issues and resulting in the only device known to be able to satisfy applications requiring multi-target designations.

Furthermore, the off-glass addressing described herein results in a much more compact unit that is well suited for tight packing into high-fill factor arrays. This increases the power in the bucket by a factor of four for phased array systems.

The polymer network liquid crystal provides the TTFOPA having higher scanning speeds, despite its order of magnitude higher addressing voltage needs; the deliberately restricted electrode count avoids the need for voltage-limited chip-on-glass addressing technology. The high voltage (100V) driver provides necessary drive voltage signals to the PNLC via an anisotropic conducting film (ACT) and flex circuit interconnect. Use of a 2-dimensional electron gas (2DEG) layer formed in a GaN/AlGaN HEMT structure (instead of an indium oxide film) results in an OPA electrode having both low resistivity and low optical absorption and which in turn supports fast control voltages.

Described above is a transmissive liquid crystal (LC) control structure. As described the such a structure includes a superstrate having a first surface having a GaN HEMT structure disposed thereon to provide a conductor on the first surface of the superstrate, a substrate having a first surface disposed over and spaced apart from the first surface of the superstrate and having a GaN HEMT structure disposed thereon to provide a conductor on the first surface of the substrate and wherein the GaN HEMT structure on one of the superstrate and substrate surfaces are patterned into individual electrodes, a polymer network liquid crystal (PNLC) disposed in the space between the first surface of the superstrate and the first surface of the substrate and a control circuit coupled to the individual electrodes.

Also described is such control structure in the context of an OPA and a TTFOPA. As will be described below, such a control structure can also be used to provide an adaptive optic (AO).

Figure 6:
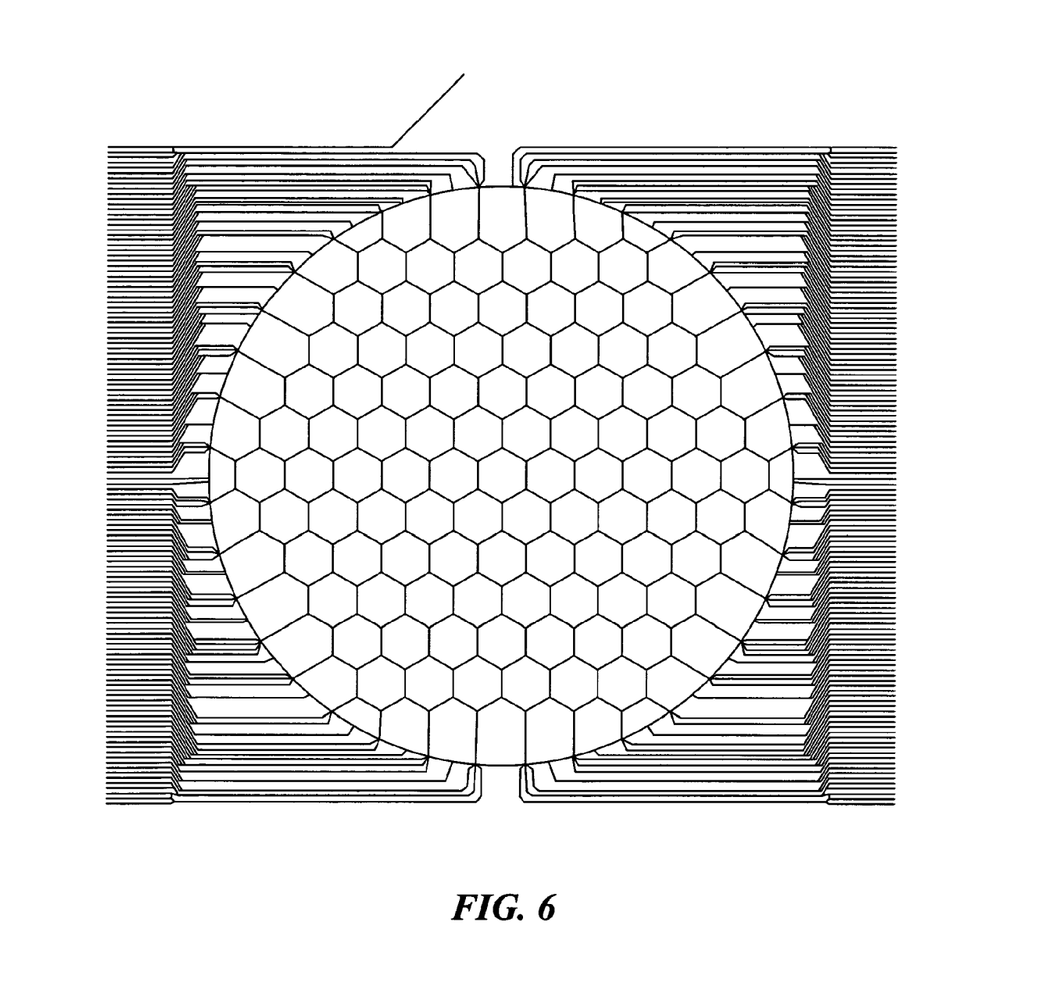
FIG. 6 is a top view of an adaptive optic which may be of the type used in the systems of FIGS. 1 and 2.

Referring now to FIG. 6, the adaptive optic (FIG. 2) may be manufactured in a manner which is the same as or similar to the TTFOPA described above in conjunction with FIGS. 2 and 4-5.

The adaptive optic (AO) comprises a voltage-addressable, transmission-mode, liquid-crystal (LC) cell, having substrates patterned into an array of independent pixels to support two-dimensional (2-D) addressing for use as an AO actuator. The pattern and the attached addressing leadouts are disposed on a substrate to support high bandwidth operation. Such substrates are selected having a high thermal conductivity characteristic and are provided having ultra-low-loss transparent conducting thin films disposed thereon.

In the exemplary embodiment described herein, the ultra-low-loss transparent conducting thin films are provided by means of epitaxial growth directly on the substrates of a Gallium Nitride (GaN) high electron mobility transistor (HEMT) structures suitably modified for optical transparency. In one embodiment, sapphire is a preferred substrate, but the substrates may also be provided from spinel or other materials. In general, substrates (in addition to sapphire and spinel) having appropriate optical characteristics and also having a appropriate heat conducting characteristics may can also be used. A GaN process as described, for example, in U.S. Pat. No. 8,268,707 assigned to the Assignee of the present application, and customized for optical applications provides a relatively low loss transparent conductive coatings known. The low absorption losses reduce (or ideally minimize) the heat deposited in the actuator by an incident high power laser beam, and sapphire substrates conduct away what little is absorbed, leaving a clear aperture that is virtually free of thermal gradients and the corresponding wave-front errors that such gradients typically generate.

In one embodiment, one of the substrates is pixilated into an array of independent actuators by etching through the GaN HEMT structure. The cell is filled with a liquid crystal formation (e.g. a polymer network liquid crystal (PNLC)). PNLC structures have a switching speed approximately one hundred (100) times faster than classic nematic materials used in prior art components.

The PNLC requires a driving voltage of the order of 100 V which is a much higher driving voltage level than that required by prior art materials. Consequently, a GaN deposition process, driver circuit design, and selection of off-glass addressing are selected for the particular application described herein.

In one embodiment, the AO pixels are provided having a square shape, but the pixels may be provided having cross-sectional shapes other than square cross-sectional shapes including but not limited to hexagonal shapes. The particular pixel shape to use in any application is selected based upon a variety of factors including, but not limited to the shape of the beams with which the AO is intended to be used pixels having a square cross-sectional shape better support use of an AO with square overall shape (clear aperture)).

As described, an adaptive optic capable of operating in a transmission mode (rather than a reflective mode, as in prior art devices) is provided. Operating in a transmission mode allows the AO to be more conveniently integrated into an optical system. In one embodiment, the AO operates at a settling time of 50 µs or less Furthermore, transmission mode operation of adaptive optics in accordance with the concepts, systems, components and techniques described herein result in an AO having no measureable interactuator coupling (as compared, for example, to MEMS-based devices having interactuator coupling of about 13% which is the smallest known interactuator coupling value in an adaptive optic).

The adaptive optic actuator comprises a combination of new technologies, namely: (1) the use of sapphire, spinel, or other substrates having a relatively high thermal conductivity characteristic; (2) the use of GaN HEMT layers as transparent conductive thin films; (3) the use of electrode connection means which enable the requirement of high voltage addressing for the PNLC to be satisfied; a unique processes for deposition of the GaN HEMT layers (due to the requirement of high voltage addressing for the PNLC); and (4) a process for forming a of conductors while maintaining high breakdown voltage.

Having described one or more preferred embodiments of the circuits, techniques and concepts described herein, it will now become apparent to those of ordinary skill in the art that other embodiments incorporating these circuits, techniques and concepts may be used. Accordingly, it is submitted that that the scope of the patent should not be limited to the described embodiments, but rather, should be limited only by the spirit and scope of the appended claims.

What is claimed is:

1. A transmissive liquid crystal (LC) control structure comprising:
    a first substrate having a first surface having a gallium nitride high electron mobility transistor (GaN HEMT) structure disposed thereon to provide a conductor on the first surface of said first substrate;
    a second substrate having a first surface disposed over and spaced apart from the first surface of said first substrate and having a GaN HEMT structure disposed thereon to provide a conductor on the first surface of said second substrate and wherein the GaN HEMT structure on one of the first and second substrate surfaces are patterned into individual electrodes;
    a polymer network liquid crystal (PNLC) disposed in the space between the first surface of said first substrate and the first surface of said second substrate; and
    a control circuit coupled to the individual electrodes.

2. The structure of claim 1 provided to form a first optical phased array (OPA).

3. The structure of claim 2 further comprising a second OPA disposed relative to said first OPA such that steering angles of said first and second OPAs are different.

4. The structure of claim 2 further comprising a second OPA disposed relative to said first OPA such that steering angles of said first and second OPAs are substantially orthogonal.

5. The structure of claim 1 further comprising a flex circuit having conductors disposed thereon and having a first end electrically coupled to said control circuit and a second end disposed over and coupled to the individual electrodes.

6. The structure of claim 5 wherein said flex circuit is provided as an anisotropic conductive film (ACF) flex circuit having ACF disposed to provide an electrical signal path between conductors on the second end of said flex circuit and the individual electrodes.

7. The structure of claim 1 provided to form an adaptive optic comprising an array of pixels, wherein each one of at least three of said array of pixels is adjacent to at least three other pixels.

8. The structure of claim 1 wherein said substrate is provided as one of: a sapphire substrate; or a spinel substrate.

9. A tip-tilt focus optical phased array comprising:
    a first optical phased array (OPA) comprising a first substrate having a first surface comprising a gallium nitride high electron mobility transistor (GaN HEMT) layer; a second substrate having a first surface comprising a GaN HEMT layer patterned into one or more electrodes with the first surface of said second substrate disposed over and spaced apart from the first surface of said first substrate; a polymer network liquid crystal disposed between the first surface of said first substrate and the first surface of said second substrate to form a liquid crystal cell; and
    a second optical phased array comprising: a first substrate having a first surface comprising a GaN HEMT layer; a second substrate having a first surface comprising a GaN HEMT layer patterned into one or more electrodes with the first surface of said second substrate of said second optical phased array disposed over and spaced apart from the first surface of said first substrate of said second optical phased array; a polymer network liquid crystal disposed between the first surface of said first substrate and the first surface of said second substrate to form a liquid crystal cell, said first and second OPAs arranged such that the one or more electrodes in said first OPA are substantially orthogonal to the one or more electrodes in said second OPA.

10. An adaptive optic comprising:
    a first optical phased array (OPA) comprising: a two-dimensional array of pixels each of said pixels provided from a liquid crystal cell comprising: a first substrate having a first surface comprising a gallium nitride high electron mobility transistor (GaN HEMT) layer; a second substrate having a first surface comprising a GaN HEMT layer patterned into one or more electrodes with the first surface of said second substrate disposed over and spaced apart from the first surface of said first substrate; a polymer network liquid crystal disposed between the first surface of said first substrate and the first surface of said second substrate to form the liquid crystal cell; and a second optical phased array comprising: a two-dimensional array of pixels each of said pixels provided from a liquid crystal cell comprising: a first substrate having a first surface with a GaN HEMT layer disposed thereon; a second substrate having first and second opposing surfaces, said second substrate having a high thermal conductivity characteristic; one or more GaN HEMT layers disposed over the first surface of said second substrate, said one or more GaN HEMT layers providing one or more electrodes; a polymer network liquid crystal disposed between the first surface of said first substrate and the first surface of said second substrate, said first and second OPAs arranged such that the one or more electrodes in said first OPA are substantially orthogonal to the one or more electrodes in said second OPA.

* * * * *